US012216671B2

(12) United States Patent
Savir et al.

(10) Patent No.: US 12,216,671 B2
(45) Date of Patent: Feb. 4, 2025

(54) AUTOMATIC DOCUMENTATION ENHANCEMENT USING ORGANIZATION QUERIES

(71) Applicant: Dell Products L.P., Round Rock, TX (US)

(72) Inventors: Amihai Savir, Newton, MA (US); Oshry Ben-Harush, Cedar Park, TX (US); Ofir Ezrielev, Be'er Sheva (IL)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 18/059,821

(22) Filed: Nov. 29, 2022

(65) Prior Publication Data

US 2024/0176791 A1    May 30, 2024

(51) Int. Cl.
| | | |
|---|---|---|
| *G06F 16/00* | (2019.01) | |
| *G06F 16/2458* | (2019.01) | |
| *G06F 16/248* | (2019.01) | |

(52) U.S. Cl.
CPC ........ *G06F 16/2465* (2019.01); *G06F 16/248* (2019.01)

(58) Field of Classification Search
CPC ............................ G06F 16/2465; G06F 16/248
See application file for complete search history.

(56) References Cited

U.S. PATENT DOCUMENTS

| | | | |
|---|---|---|---|
| 9,037,598 | B1 | 5/2015 | Morton |
| 9,514,184 | B2* | 12/2016 | Wulff ................ G06F 16/245 |
| 10,650,007 | B2* | 5/2020 | Azzam ................ G06F 16/248 |
| 10,909,148 | B2* | 2/2021 | Rogulenko ......... G06F 16/9024 |
| 11,941,020 | B2* | 3/2024 | Mitelman ................ G06N 3/09 |
| 2009/0099901 | A1* | 4/2009 | Sah .................... G06F 16/9538 707/999.005 |
| 2014/0358879 | A1 | 12/2014 | Bao |
| 2016/0224621 | A1* | 8/2016 | Bousquet ........... G06F 16/9535 |
| 2019/0102430 | A1* | 4/2019 | Wang ...................... G06N 7/01 |
| 2021/0056956 | A1 | 2/2021 | Dimitriadis |
| 2021/0176279 | A1* | 6/2021 | Raphael ............... H04L 63/104 |
| 2023/0031591 | A1* | 2/2023 | Remis ................. G06F 16/9038 |
| 2023/0244658 | A1* | 8/2023 | Dangoor ............. G06F 16/2423 707/769 |
| 2023/0282368 | A1 | 9/2023 | Josephson |
| 2024/0004932 | A1* | 1/2024 | BenHarush .......... G06F 16/242 |
| 2024/0176791 | A1* | 5/2024 | Savir ................... G06F 16/248 |

OTHER PUBLICATIONS

Graphical Query Designer User Interface; https://docs.microsoft.om/en-us/sql/reporting-services/report-data/graphical-query-designer-user-interface?view=sql-server-ver16; Jan. 20, 2022.
(Continued)

*Primary Examiner* — Noosha Arjomandi
(74) *Attorney, Agent, or Firm* — Workman Nydegger

(57) ABSTRACT

Enhancing documentation of data entities in a datastore. Queries from a query database are analyzed to generate insights into the data entities in the datastore and/or processes of an organization. The insights generated from the queries are added to the documentation of the data entities. The insights enhance the documentation and improve query formulation, data entity understanding, and query results.

20 Claims, 7 Drawing Sheets

(56) References Cited

OTHER PUBLICATIONS

How to Represent an SQL Query Graphically https://stackoverflow.com/questions/39231976/how-to-represent-an-sql-query-graphically; accessed Jun. 22, 2022.

Ma et al., "Deep Graph Similarity Learning: a Survey"; Data Mining and Knowledge Discovery; https://arxiv.org/abs/2102.10757; Dec. 25, 2019.

Xie et al., "Self-Supervised Learning of Graph Neural Networks: A Unified Review"; https://arxiv.org/abs/2102.10757; Feb. 22, 2021.

Database Documentation Generators, https://dbmstools.com/categories/database-documentation-generator-tools; accessed Jun. 22, 2022.

* cited by examiner

Query:

Select Col. 1, Col. 2, Col. 4, Col. 6, AVG(Col. 2)

From (Table 1 JOIN Table 2 on Table 1. Col. 2 = Table 2.Col.4)

Where Col. 1 > X or Col. 1 < Y

Group by Col. 1

Figure 3A

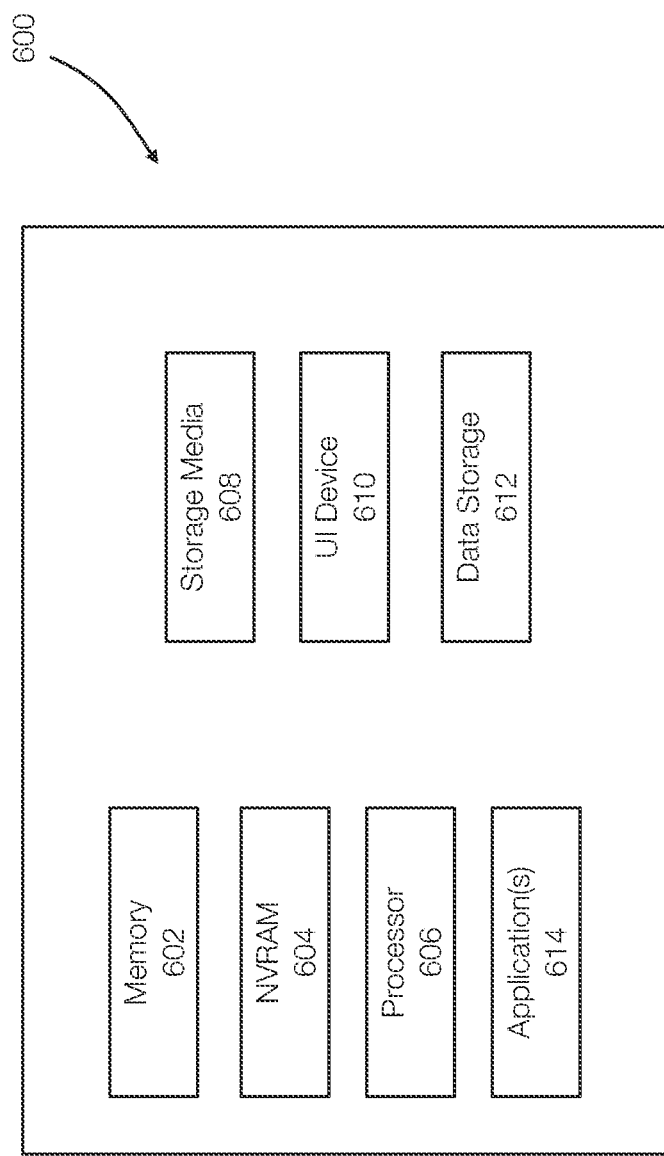

AUTOMATIC DOCUMENTATION ENHANCEMENT USING ORGANIZATION QUERIES

FIELD OF THE INVENTION

Embodiments of the present invention generally relate to data management, data mining, and generating insights from data. More particularly, at least some embodiments of the invention relate to systems, hardware, software, computer-readable media, and methods for documenting data or datastores.

BACKGROUND

Generating insights from data can be beneficial for a variety of reasons. The insights gained from analyzing data may improve processes, sales, and other aspects of an organization. Often, data scientists are asked to analyze an organization's data. Specifically, Data scientists may be given access to data that they can analyze or process. Insights identified by the data scientists may help organizations, for example, make better decisions, react more quickly to market conditions, and improve performance or productivity.

Working with data, however, can be challenging. For example, a domain expert is typically the most knowledgeable about the data and processes relevant to their domain compared to the data scientists or other users. However, the availability of domain experts is often limited. Further, due to their expertise and familiarity with the data, the domain experts may not rigorously document their data or process.

Consequently, data scientists and other analysts often spend time performing data tasks that take away from time needed for model development, data refinement and insight generation. For example, data scientists may spend time building training data sets, cleaning and organizing the data, collecting the data, understanding the data and the like. Sharing knowledge, documenting data, storing data (e.g., location), accessing the data, and searching data are all questions that may be difficult to answer and tasks that are difficult to perform.

In addition, the manner in which data is processed can have a significant impact on insights generated from the data. For example, applying an incorrect filter to a query may return erroneous or bad data. When erroneous or bad data is included in a dataset, that erroneous or bad data may contribute to inaccurate insights and poor performance in the production stage.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3A discloses aspects of a query;

FIG. 6 discloses aspects of a computing device, system, or entity.

DETAILED DESCRIPTION OF SOME EXAMPLE EMBODIMENTS

Figure 1:
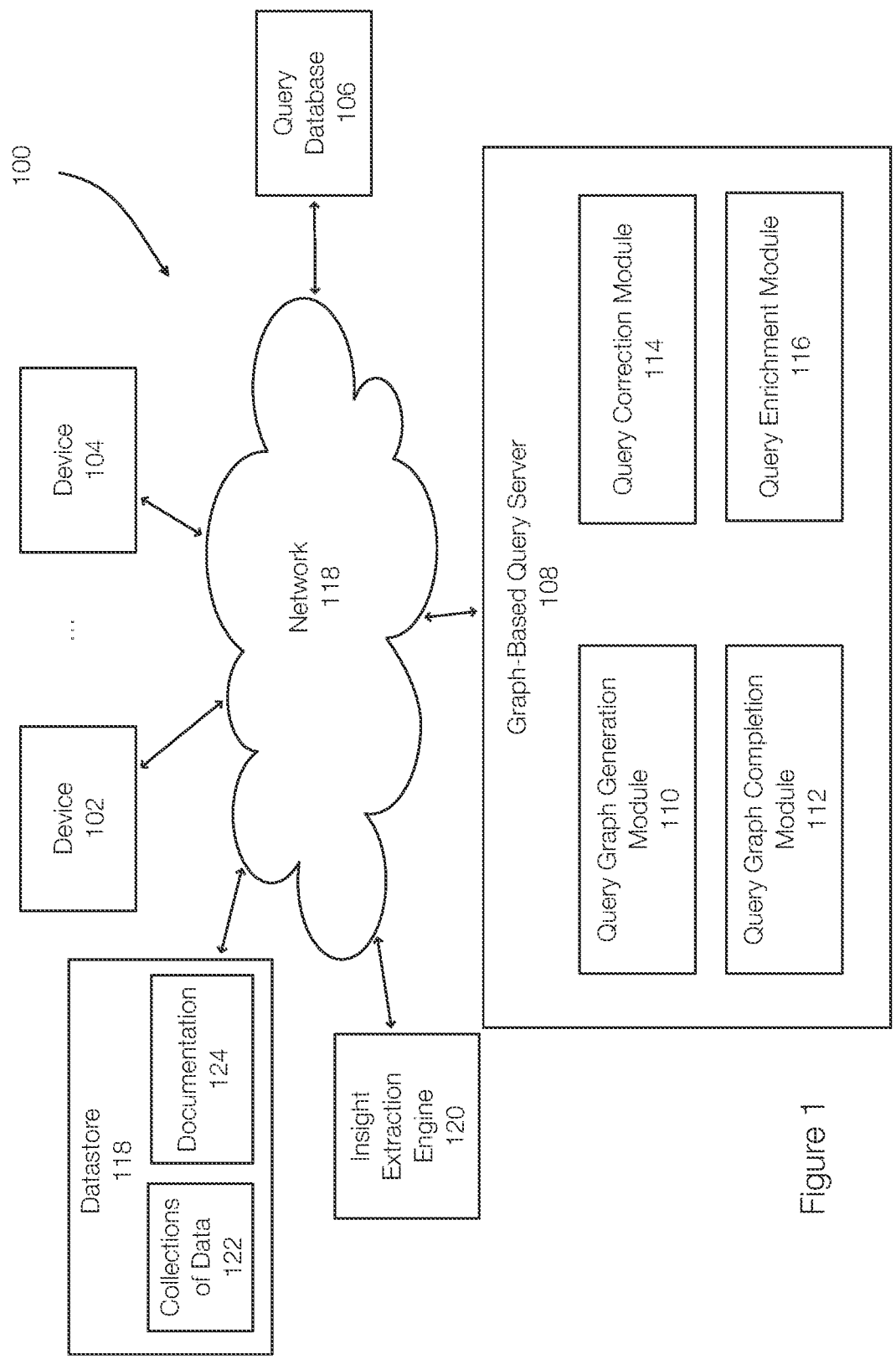
FIG. 1 discloses aspects of generating a query for querying a datastore and a query database for storing queries.

Embodiments of the present invention generally relate to data management and to documenting data. More particularly, at least some embodiments of the invention relate to systems, hardware, software, computer-readable media, and methods for enhancing the documentation of a data using insights generated or extracted from queries to the data.

Domain experts are largely responsible for managing an organization's data and related business processes for a given domain. Domain experts, however, often have limited availability and may not always provide rigorous documentation of the data or of the business process. Interacting with domain experts in order to identify and better understand the organization's data or business process can be difficult.

As used herein, a datastore may refer, by way of example only, to a repository for storing and/or managing collections of data such as databases, files, emails, sensor data, or other datasets. The datastore may also include a query database, which is configured to store queries that are executed on the data stored in the datastore and/or other datastores. Each collection of data in a datastore may be associated with documentation that describes the collection of data or that provides information about the data. The documentation may include, for example, a file manifest, a description of the dataset, codebooks, descriptions of variables, the purpose of the data collection, data collection procedures, the structure and organization of the files, confidentiality, access, and use conditions, manipulations conducted on raw data, time and timing of data collection, or the like.

The documentation that may accompany collection of data may be based on a schema. The schema may be configured to collect specified information to include in the data's documentation. This may be implemented as or include user-fillable fields. However, schema-based documentation may not be exhaustive in nature or provide information related to how the data is used in the organization in queries.

In one example, a collection of data may be referred to as a data entity. A data entity, by way of example only, may be a set of items that share common characteristics and may be implemented in a database. A data entity may be a specific column or the like. An entity page is documentation of the data entity. In one example, each data entity is associated with an entity page. The terms data entity and entity page are not limited and may include other or different aspects or characteristics.

Embodiments of the invention may receive a query, which may be converted to a graphical form. Insights may be extracted or generated from the graphical query and/or from other forms of the query. Stated differently, embodiments of the invention gain insights into data not only from the data itself but also from queries into the data. Thus, queries provide insight into how certain data is used or how processes are performed.

For example, when a column is grouped on, certain data aggregations may be present in the query. Queries performed by a specific organization or group of an entity may join certain tables in their queries. Certain columns may be filtered in queries from a particular organization when the queries also reference a second collection of data. Embodiments of the invention evaluate the queries to extract insights from the queries.

The documentation of the data entities can be augmented or enhanced using the insights generated or extracted from the queries. In some examples, the queries used to query a specific collection of data are used to generate insights for that specific collection of data. Alternatively, insights may be extracted from queries that may be applicable to multiple collections of data.

Before discussing automatic enhancing documentation using queries, generating a graphical representation of a query from a text-based query are discussed with respect to FIGS. 1-3B.

One or more aspects of the disclosure recognize that improperly composed queries may lead to inaccurate and/or incomplete data that may skew the desired insights. The manner in which a business process is reflected in the organization's data, the particular data to use for a given query, and/or the flags used in the given query to filter the data may all contribute to obtaining the proper data, in response to the given query, for a given analysis. For example, the application of an improper filter may introduce archived, erroneously flagged and/or otherwise poor data into the resulting data used for analysis. Thus, insights obtained from such resulting data may be inaccurate and/or incomplete, or otherwise result in poor performance.

Graph-based query processing techniques are disclosed that generate graphical query representations comprised of nodes, edges and labels based on the content of a given query.

FIG. 1 discloses aspects of an information processing system 100 (system 100) configured to generate a graphical query from a query. The system 100 may include various devices, represented by devices 102 and 104. Queries, for example, may be generated at the devices 102 and 104. The system 100 may include one or more graph-based query processing servers 108 and a query database 106.

The device 102 and 104 may include or represent host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The devices may each include a network client that includes networking capabilities such as ethernet, Wi-Fi, etc.

The devices 102 and 104 and the graph-based query processing server 108 may be coupled to a network 118. The network 118 may include a wide area network (WAN), a local area network (LAN), a satellite network, a telephone or cable network, a cellular network, a wireless network such as a Wi-Fi or WiMAX network, or various portions or combinations of these and other types of networks.

The devices 102 and 104 and the graph-based query processing server 108 may include processing devices of one or more processing platforms. For example, the graph-based query processing server 108 may include one or more processing devices each having a processor and a memory, possibly implementing virtual machines and/or containers, although numerous other configurations are possible.

In one example, the graph-based query processing server 108 comprises a query graph generation module 110, a query completion module 112, a query correction module 114 and a query enrichment module 116, as discussed further below. In one or more embodiments, the query graph generation module 110 may be used, for example, to generate a graphical representation of one or more queries. The query completion module 112 may leverage graphical representations of historical queries to automatically generate a suggested completion of at least one partial user query.

The query correction module 114 may leverage graphical representations of historical queries to automatically generate a suggested correction of one or more errors identified in at least one user query. The query enrichment module 116 may leverage graphical representations of historical queries to automatically generate a suggested completion of or addition to at least one partial user query.

The functionality associated with modules 110, 112, 114, and 116 in other embodiments can be combined into a single module or separated across a larger number of modules.

The graph-based query processing server 108 may be associated with a query database 106 configured to store information related to one or more queries, such as query metadata and/or graphical representations of user queries and/or modifications made to user queries. The queries themselves may also be stored in the query database 106.

In some embodiments, the query metadata for historical queries of a given organization may include, for example, data objects, query submitter identifier, query submitter organization and job description, frequency of query runs, query flags, query filters and/or a flag indicating whether the query is performed multiple times or one time. The query database 106 may be implemented using one or more storage systems.

The devices 102 and 104 and the graph-based query processing server 108 may be associated with input/output devices, which illustratively comprise keyboards, displays or other types of input/output devices in any combination. Such input/output devices can be used, for example, to support one or more user interfaces to a device 102, as well as to support communication between the graph-based query processing server 108 and/or other related systems and devices not explicitly shown.

The system 100 may be associated with a datastore 118. The datastore 118 may store collections of data 122 of an organization or other entity. The datastore 118 as a whole and/or each collection of data in the datastore 118 may be associated with documentation 124. An insight extraction engine 120 is configured to analyze queries stored in the query database 106 to generate/extract insights that can be added to the documentation 124.

Figure 2:
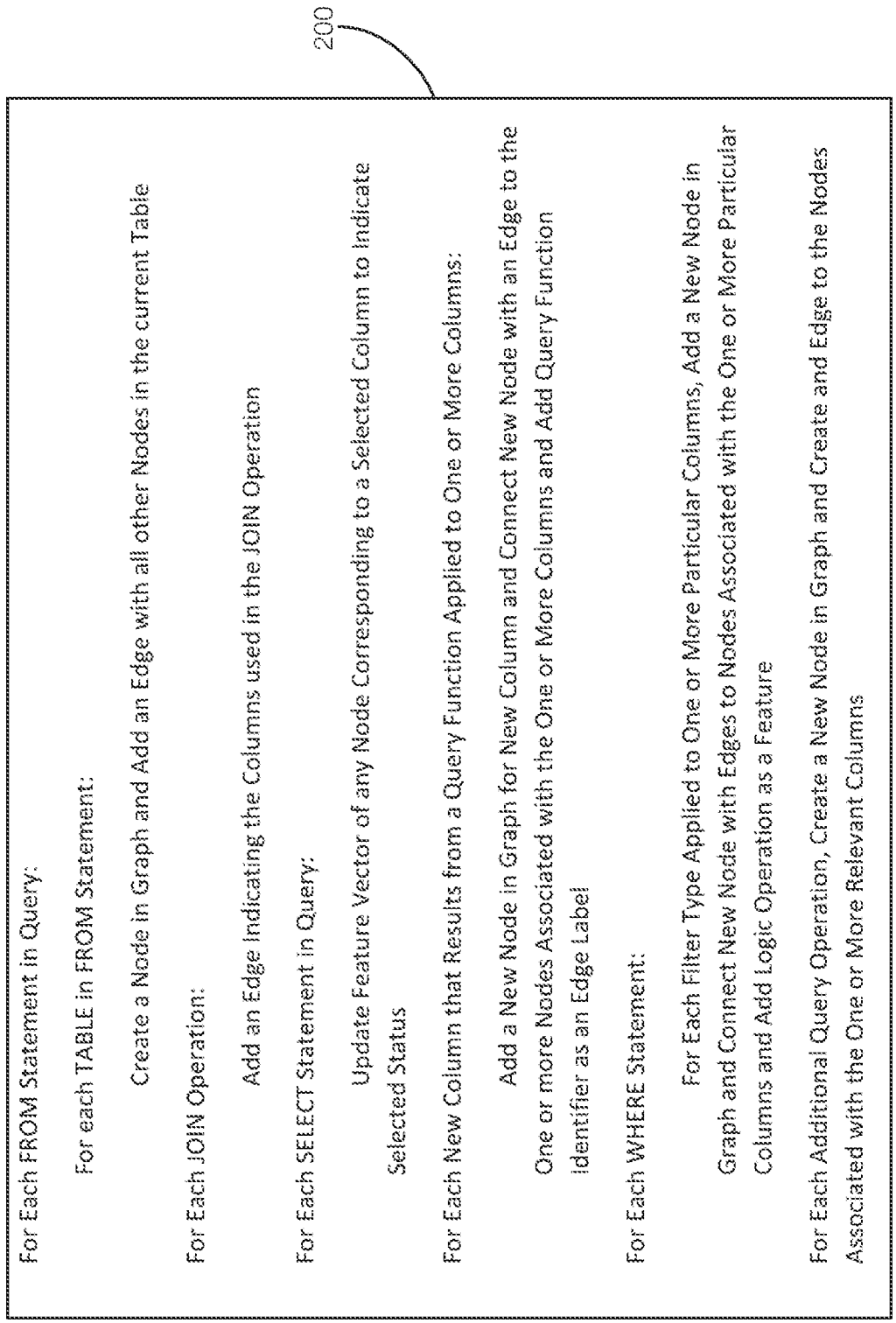
FIG. 2 discloses aspects of converting a query to a graphical representation of the query.
Figure 3B:
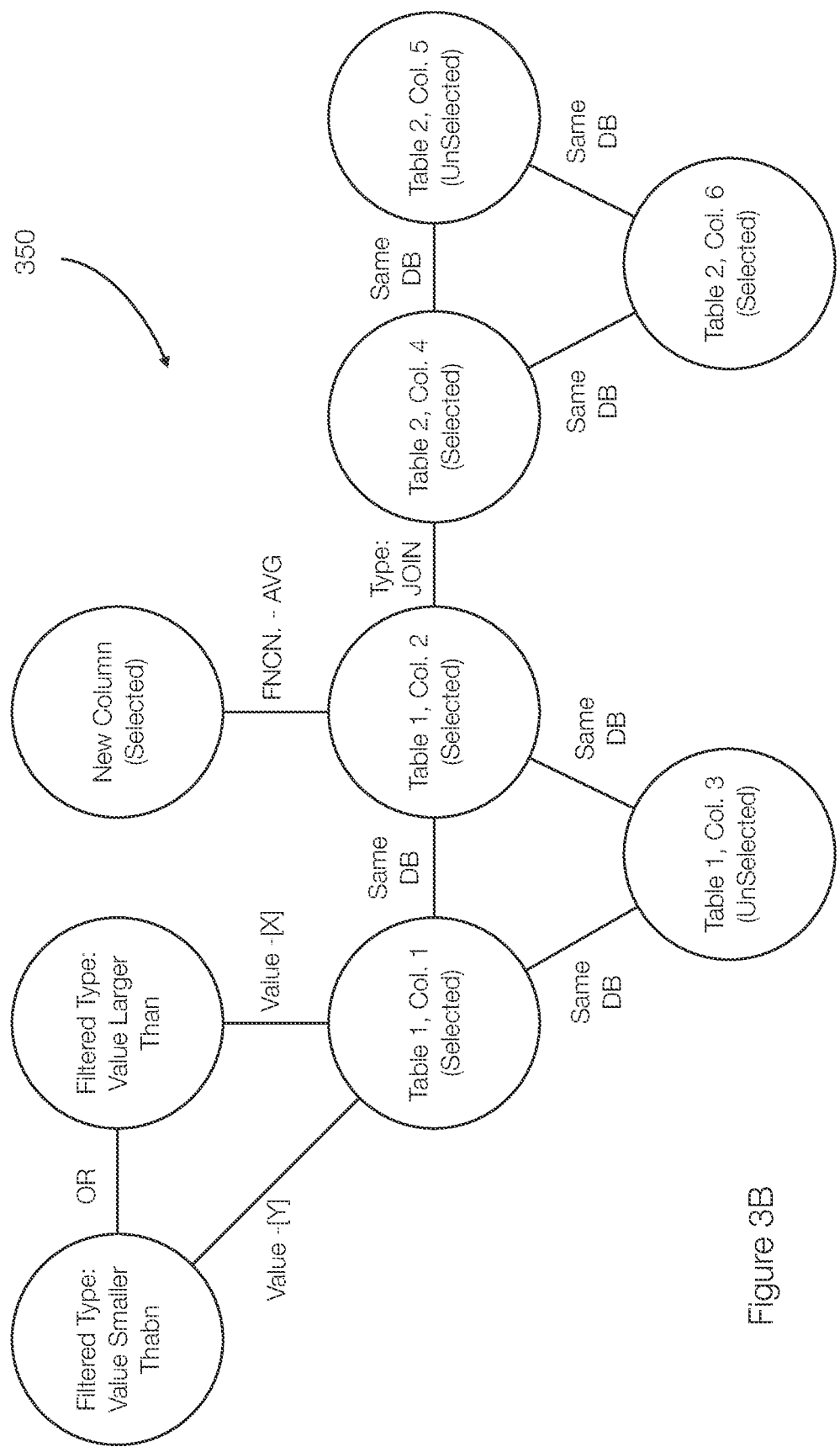
FIG. 3B discloses aspects of a query graph generated from the query of FIG. 3B.

FIG. 2 illustrates an example of pseudo code 200 for generating a graphical representation of a query. The example of FIG. 2 and the related examples of FIGS. 3A and 3B, are directed to processing representative queries in the Structured Query Language (SQL). The disclosed techniques for generating graphical query representations of a given query and for modifying queries using such graphical query representations may also be applied in non-SQL environments as well.

The pseudo code 200 includes a number of steps to construct a graph representing a given query expressed in the SQL language. The pseudo code 200 processes different types of query statements and operations, for example, to generate the graph representing the given query. The pseudo code 200 includes a first loop for processing "from" statements in a query that reference one or more columns in one or more database tables. A first sub-loop is initiated for each database table referenced in a "from" statement and a second sub-loop is initiated for each column of the current database table. For a given column being processed, a node is added in the graph and one or more edges are added to all other nodes in the current table.

The pseudo code 200 includes a second loop for processing "join" operations in a query that connects two or more database tables using two or more columns identified in the "join" operation. The second loop adds an edge to the graph to indicate the columns used in the "join" operation. A third loop in the pseudo code 200 processes "select" statements in a query to select columns from a database table. The third loop updates the feature vector of any node corresponding to a selected column to indicate the selected status.

The pseudo code 200 includes a fourth loop for processing new columns that result from a query function in a query that is applied to one or more columns (for example, determining an average of a column, which is an example of an aggregation). The fourth loop adds a new node in the graph for a given new column and connects the new node with an edge to the one or more nodes associated with the one or more columns that the query function was applied to and adds a query function identifier as an edge label to the added edge.

The pseudo code 200 further includes a fifth loop for processing "where" statements in a query. The fifth loop comprises a sub-loop for each filter type applied to one or more particular columns. The sub-loop of the fifth loop adds a new node in the graph and connects the new node with edges to nodes associated with the one or more particular columns and adds the logic operation as a feature of the new nodes.

A sixth loop in the pseudo code 200 processes additional query operations and creates an edge to the nodes associated with the one or more relevant columns of the additional query operations.

It is noted, in one example, that a "group by" clause in a query is used to obtain summary data based on one or more groups. The groups can be formed on one or more columns. For example, a group by query may be used to count a number of employees in a given company or department, or to obtain the total salaries for a given department.

As noted above, the disclosed techniques for generating graphical query representations of a given query and for modifying queries using such graphical query representations may also be applied in non-SQL environments. For example, FROM statements in an SQL query, for example, may be more generally referred to herein as statements in a given query that identify one or more information elements that a given query is to be applied against. The information elements may comprise, for example, one or more data structures (such as database tables in a SQL environment) and/or one or more data objects (such as JSON (JavaScript Object Notation) files, blobs or data objects in a non-SQL environment). Thus, the database tables referenced in FIG. 2 may alternatively be referred to as JSON blobs or data objects in other embodiments. In addition, the data columns referenced in FIG. 2 may alternatively be referred to as data fields in other embodiments (e.g., when dealing with a JSON object, each data field may be a key having a corresponding value).

In addition, "join" operations in a SQL query, for example, may be more generally referred to herein as operations that establish a connection between two or more information elements based on a related data field in the two or more information elements. "Select" statements in a SQL query, for example, may be more generally referred to herein as statements in a given query that select one or more data fields.

Further, "where" statements in a SQL query, for example, may be more generally referred to herein as statements (or operations) that specify one or more conditions (e.g., filters) for obtaining data from one or more information elements.

FIG. 3A illustrates a representative query 300 in accordance with an illustrative embodiment. Generally, a query may include or identify base objects (such as tables or databases); data columns or metadata; data joins or merges; filters or flags; overlay functions (such as those used to create new data columns or groupings); and later data splits (such as creation of training data, evaluation data and test data). Query-level information, such as a frequency of query runs, may be used in some embodiments for differentiated weighting of data samples or graph-level features. A given query can be tokenized to its constituent parts, which will become nodes and edges in the graphical representation of the given query.

In the example of FIG. 3A, the exemplary SQL query 300 includes a "select" statement that selects columns 1, 2, 4, 6 and an average of column 2 from database tables 1 and 2 identified in a "from" statement. The database tables 1 and 2 are joined in the query 300 on identified columns (e.g., column 2 of table 1 and column 4 of table 2) specified in the "join" statement. The "where" statement in the example of FIG. 3A filters the data records in column 1 of table 1 to values greater than a value, X, or values smaller than a value, Y. The "group by" statement in the SQL query 400 can be used to obtain summary data by forming a data group on column 1.

FIG. 3B illustrates an exemplary graphical representation 350 of the query 300 that is constructed using the pseudo code 200 of FIG. 2. In the example of FIG. 3B, an exemplary heterogeneous graph representation is provided for the representative query 300 (e.g., against a SQL database or a NoSQL database using, for example, metadata tagging). The exemplary graphical representation 350 includes a plurality of nodes connected by edges in accordance with the pseudo code 200 of FIG. 2. In some embodiments, the graphical representation 350 of a given query may be implemented as a heterogeneous query graph comprising nodes and/or edges of different types. For example, in some embodiments, the nodes and/or edges of a given query graph may be encoded using different colors to represent a corresponding different respective type. In another implementation, a given edge may be represented by a vector comprising different features and/or dimensionality.

Figure 4:
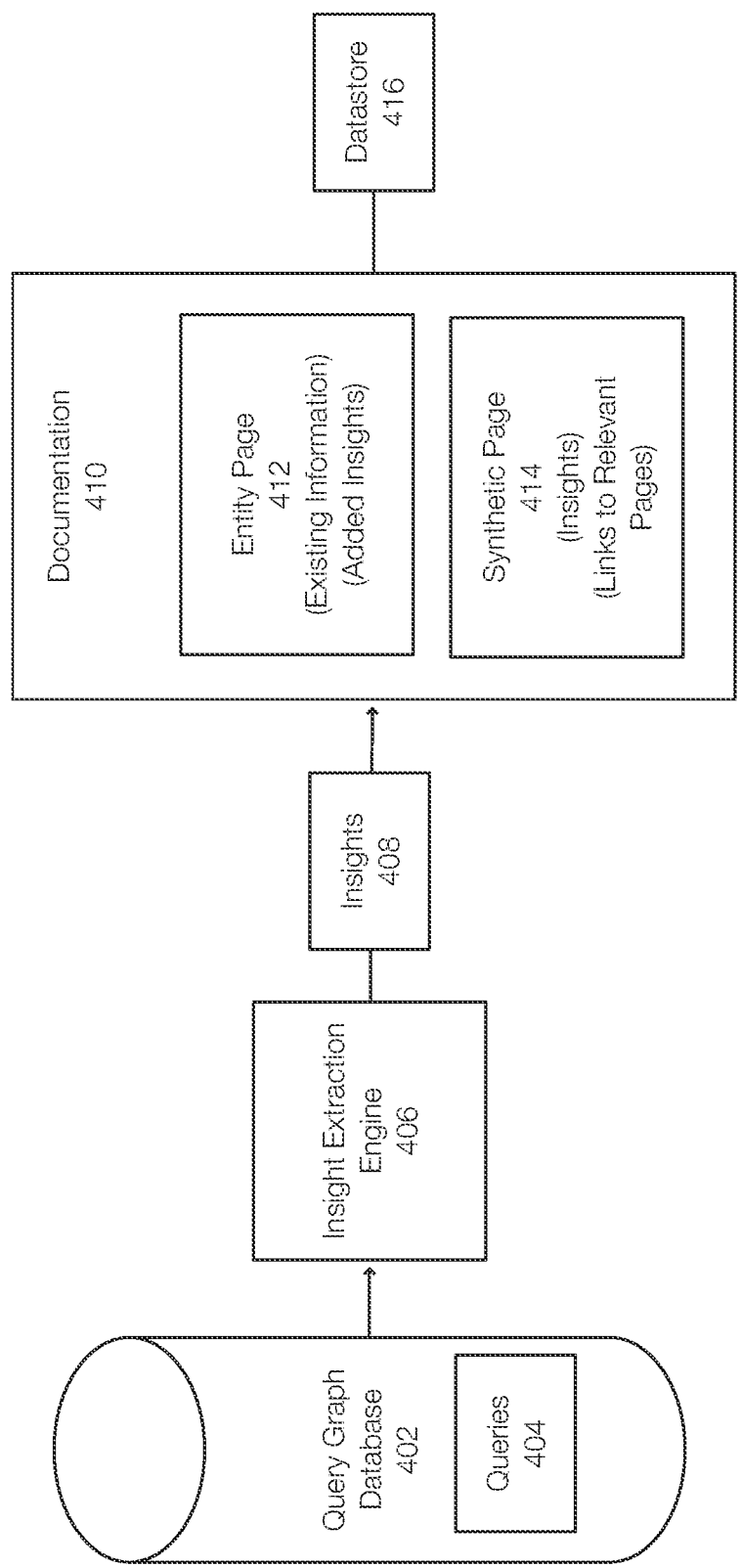
FIG. 4 discloses aspects of an insight extraction engine configured to generate insights from queries and enhance the documentation of a datastore.

FIG. 4 discloses aspects of extracting insights from queries. FIG. 4 illustrates a query graph database 402, which may store queries 404 in graphical form, although embodiments of the invention are not limited to generating insights from graphical representations of queries. The queries 404 stored in the query graph database 402 may be related to multiple collections in a datastore and/or to multiple collections in multiple datastores and may be associated with one or more organizations. Previously formed and executed queries 404 may be included or stored in the query graph database 402.

An insight extraction engine 406 may evaluate the queries 404 stored in the query graph database 402 and generate insights 408. The insights 408 can then be added to the documentation 410 of the relevant collections. In one example, insights are added to entity pages of data entities in a datastore.

More specifically, the documentation 410 may include pages such as entity pages and synthetic pages, represented respectively by the entity page 412 and the synthetic page 414. The entity page 412 may store information about, related to, or describing a collection of data, a data object, a group of files, or the like or combination thereof. For example, an entity may be an object such as a customer object that stores customer data. The entity page 412 may provide an abstraction and view (e.g., an encapsulation) of tables, table schemas, data concepts, data functionalities, or the like or combination thereof of the entity or the collection of data. The entity page 412 may include existing information (e.g., metadata) that may have been provided, for example, by the domain expert or other user.

The synthetic page 414 may be similar to an entity page 412. In one example, however, the synthetic page 414 corresponds to synthetic or generated data and may include links to relevant pages. Synthetic data is generated or created to simulate real data or real samples. The links may link to real data or the like and may be described, in one example, by the existing information in the linked pages. Alternatively, the synthetic page 414 may relate to or describe synthetic columns that may be created during the query by complex functions or for other reasons. In this example, the insights 414 can be added to the synthetic page 414 and links to the relevant entity pages, columns, or other data may be included in the synthetic page 414.

In one example, synthetic entities may be created when performing complex functions inside queries. Embodiments of the invention thus include discovering synthetic entities created by the complex operations inside the query and creating a synthetic entity page for each of the synthetic entities. The insights can be added to the relevant synthetic pages.

The insight extraction engine 406 may retrieve the queries 404 from the query graph database 402 and generate insights 408. The insights 408 may be added to the entity page 412 and/or the synthetic page 414 as additional or enhanced documentation. This insight extraction engine 406 is configured to enhance or augment the documentation 410 with insights generated not from the actual real or synthetic data, but from queries to the data in the datastores.

When training a machine learning model, one of the first steps is to procure or generate a training dataset. The training dataset may include data from the collections of data in a datastore and may include real and/or synthetic data. A query may be used to identify data from one or more collections in one or more datastores to include in the training dataset. The documentation 410 may be used in forming the initial query, the results of which form the basis of the training dataset.

Enhancing the documentation 410 with insights 408 generated from the queries 404 can improve the use of the datastore 416 described or associated with the documentation 410 and improve the training dataset or other result. The insights 408 added to the documentation 410 (e.g., to the entity page 412 and/or to the synthetic page 414) may aid in formulating a query.

For example, the query 300 in FIG. 3A, when processed by the insight extraction engine 406, may result in insights 408. The insights 408 from the query 300 may include the insight that, when grouping by column 1, an aggregation of column 2 may be present (e.g., an average of column 2). Another insight is that when a particular entity (e.g., group or division of an organization) performs a query, table 1 is joined with table 2. Another insight 408 may be that column 1, when selected, is filtered by a certain value. The insights 408 generated from the queries 404 enhance the documentation 410.

For example, a user may review the documentation 410 (more specifically the entity page 412) when preparing to formulate a query on a data entity associated with the entity page 412 in the datastore 416. The insight that an aggregation of column 2 is added or present when grouping by column 1 may influence the formulation of the query. Without the insight from the query, this information is unavailable in the entity page 412. Embodiments of the invention thus improve the knowledge base of an organization.

Figure 5:
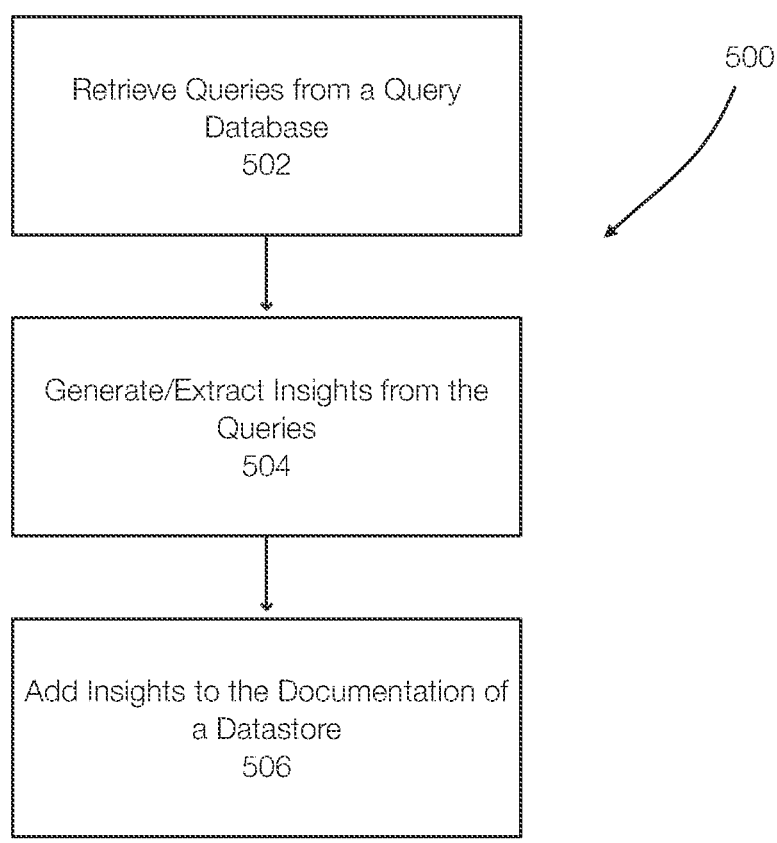
FIG. 5 discloses aspects of generating insights and/or enhancing the documentation of a datastore.

FIG. 5 discloses aspects of enhancing the documentation of data collections or data entities. In the method 500, queries are retrieved 502 from a query database. The queries retrieved from the query database are typically historical queries that have been previously formulated and/or executed. The queries may be in graphical form. The queries may also include synthetic queries, updated queries, corrected queries, or the like. An insight extraction engine may generate/extract 504 insights from the queries.

Generating or extracting the insights from the queries may include parsing the queries to identify, for example, the various commands or identifiers in the query such as FROM, JOIN, SELECT, WHERE, GROUP BY, or the like. The specific commands or identifiers may depend on the type of datastore, or other factors. Generating or extracting insights may include identifying which tables of a datastore are often joined or grouped, identifying which aggregations are present based on groupings or joinings, identifying when new columns are added, identifying relationships between filters, selected tables, from statements, or the like.

More generally, the insight extraction engine is configured to generate insights that allow the collections of data or data entities stored in datastores to be used more effectively and queried more precisely and that allow the collections of data to be better understood. A better understanding of the data or insights into how the data has been previously queried allows queries and the results of queries to be better and more focuses. The enhanced documentation, which includes insights generated by the insight extraction engine, can be reviewed by a user prior to formulating a query. The insights 408 may reflect information related to base objects (e.g., tables or databases), data columns or metadata, data joins, or mergers, filters or flags, overlay functions (e.g., to create new data columns or groupings), later splits, or the like or combinations thereof.

The insights 408 allow data know-how to be more easily maintained and allow the expertise of domain experts to be included in the documentation of the data and/or business processes. The insights 408 can reduce the time spent by data scientists and analysts in building training data sets, cleaning and organizing data, mining data for patterns, refining algorithms, and the like. Understanding how a datastore was previously queried, for example, can reduce the time required for these preparatory tasks. Enhancing the documentation 410 with insights generated from the queries reduces the occurrence of misinformed queries, which may lead to inaccurate data that may skew production insights.

Other insights from the queries 404, such as frequency of runs can be generated by evaluating queries in groups or in the context of a particular datastore. In some examples, production insights (insights generated from models trained from datasets resulting from queries) may also be used to enhance the documentation.

Once the insights have been generated or extracted from the queries, the insights may be added 506 to the documentation of a datastore. The insights may be added to specific entity pages and/or synthetic pages. The insights may relate to specific collections, specific data entities, or specific portions of the data in the datastore, to specific databases, or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, datastore operations, database operations, query operations, or the like, which may include, but are not limited to, query retrieval operations, insight generation/extraction operations, documentation enhancement operations, query formulation operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, query, extract searching, documenting, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data storage, model training, query analysis, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, objects, datastores, and any group of one or more of the foregoing.

Example embodiments of the invention are applicable to any system capable of storing and handling various types of objects, in analog, digital, or other form.

It is noted with respect to the disclosed methods, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: retrieving queries from a query database, wherein each of the queries includes a query to one or more data entities stored in a datastore, wherein the one or more data entities in the datastore are each associated with documentation, generating insights from the queries, wherein the insights include at least how the one or more data entities in the datastore are queried, and adding the insights to documentation of the one or more data entities, the documentation including an entity page for each of the one or more data entities.

Embodiment 2. The method of embodiment 1, further comprising adding the insights generated from a particular query from the query database directed to a particular data entity to the documentation associated with the particular data entity, the documentation including a particular data entity page for the particular data entity.

Embodiment 3. The method of embodiment 1 and/or 2, further comprising one or more of: discovering synthetic entities created by complex operations inside the query and creating a synthetic entity page for each of the synthetic entities, and adding the insights to relevant synthetic pages.

Embodiment 4. The method of embodiment 1, 2, and/or 3, further comprising extracting the insights from the queries retrieved from the query database.

Embodiment 5. The method of embodiment 1, 2, 3, and/or 4, wherein the insights include identifying specific data aggregations when specific columns are selected.

Embodiment 6. The method of embodiment 1, 2, 3, 4, and/or 5, wherein the insights include relationships between base objects, data columns, data metadata, data joins, data merges, filters, and/or flags.

Embodiment 7. The method of embodiment 1, 2, 3, 4, 5, and/or 6, wherein the insights describe a relationship between a grouped column to data aggregations, between joined tables and an organization that performs queries, and/or between queries of a first organization and second datastores.

Embodiment 8. The method of embodiment 1, 2, 3, 4, 5, 6, and/or 7, wherein the insights include links to a new entity page and related data entity pages.

Embodiment 9. The method of embodiment 1, 2, 3, 4, 5, 6, 7, and/or 8, wherein the insights and links to relevant data entity pages and/or relevant data entities are added to data entity pages in the documentation.

Embodiment 10. The method of embodiment 1, 2, 3, 4, 5, 6, 7, 8, and/or 9, further comprising formulating a new query using the documentation and the insights added to the documentation.

Embodiment 11. A system, comprising hardware and/or software, operable to perform any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11. The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term engine, client, module, component, or agent, may refer to software objects or routines (and/or hardware) that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 6, any one or more of the entities disclosed, or implied by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein. The device 600 may also represent a server, a cluster of servers, or other computing environment.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    retrieving queries from a query database, wherein each of the queries includes a query to one or more data entities stored in a datastore, wherein the one or more data entities in the datastore are each associated with documentation;
    generating insights from the queries, wherein the insights include at least how the one or more data entities in the datastore are queried, wherein generating insights includes evaluating the queries to identify one or more of commands, identifiers, groupings, and/or relationships used in the one or more queries submitted to the one or more data entities; and
    adding the insights to documentation of the one or more data entities, the documentation including an entity page for each of the one or more data entities.

2. The method of claim 1, further comprising adding the insights generated from a particular query from the query database directed to a particular data entity to the documentation associated with the particular data entity, the documentation including a particular data entity page for the particular data entity.

3. The method of claim 1, further comprising one or more of:
    discovering synthetic entities created by complex operations inside the query and creating a synthetic entity page for each of the synthetic entities; and
    adding the insights to relevant synthetic pages.

4. The method of claim 1, further comprising extracting the insights from the queries retrieved from the query database.

5. The method of claim 1, wherein the insights include identifying specific data aggregations when specific columns are selected.

6. The method of claim 1, wherein the insights include relationships between base objects, data columns, data metadata, data joins, data merges, filters, and/or flags.

7. The method of claim 1, wherein the insights describe a relationship between a grouped column to data aggregations, between joined tables and an organization that performs queries, and/or between queries of a first organization and second datastores.

8. The method of claim 1, wherein the insights include links to a new entity page and related data entity pages.

9. The method of claim 1, wherein the insights and links to relevant data entity pages and/or relevant data entities are added to data entity pages in the documentation.

10. The method of claim 1, further comprising formulating a new query using the documentation and the insights added to the documentation.

11. A non-transitory storage medium having stored therein instructions that are executable by one or more hardware processors to perform operations comprising:
    retrieving queries from a query database, wherein each of the queries includes a query to one or more data entities stored in a datastore, wherein the one or more data entities in the datastore are each associated with documentation;
    generating insights from the queries, wherein the insights include at least how the one or more data entities in the datastore are queried, wherein generating insights includes evaluating the queries to identify one or more of commands, identifiers, groupings, and/or relationships used in the one or more queries submitted to the one or more data entities; and
    adding the insights to documentation of the one or more data entities, the documentation including an entity page for each of the one or more data entities.

12. The non-transitory storage medium of claim 11, further comprising adding the insights generated from a particular query from the query database directed to a particular data entity to the documentation associated with the particular data entity, the documentation including a particular data entity page for the particular data entity.

13. The non-transitory storage medium of claim 11, further comprising one or more of:
    discovering synthetic entities created by complex operations inside the query and creating a synthetic entity page for each of the synthetic entities; and
    adding the insights to relevant synthetic pages.

14. The non-transitory storage medium of claim 11, further comprising extracting the insights from the queries retrieved from the query database.

15. The non-transitory storage medium of claim 11, wherein the insights include identifying specific data aggregations when specific columns are selected.

16. The non-transitory storage medium of claim 11, wherein the insights include relationships between base objects, data columns, data metadata, data joins, data merges, filters, and/or flags.

17. The non-transitory storage medium of claim 11, wherein the insights describe a relationship between a grouped column to data aggregations, between joined tables and an organization that performs queries, and/or between queries of a first organization and second datastores.

18. The non-transitory storage medium of claim 11, wherein the insights include links to a new entity page and related data entity pages.

19. The non-transitory storage medium of claim 11, wherein the insights and links to relevant data entity pages and/or relevant data entities are added to data entity pages in the documentation.

20. The non-transitory storage medium of claim 11, further comprising formulating a new query using the documentation and the insights added to the documentation.

* * * * *